United States Patent [19]

Smith, III

[11] Patent Number: 5,775,744

[45] Date of Patent: Jul. 7, 1998

[54] SLEEVE FOR QUICK DISCONNECT COUPLING

[75] Inventor: Robert E. Smith, III, Missouri City, Tex.

[73] Assignee: National Coupling Inc., Stafford, Tex.

[21] Appl. No.: 662,660

[22] Filed: Jun. 14, 1996

[51] Int. Cl.$^6$ .................................................. F16L 21/08
[52] U.S. Cl. ........................ 285/401; 285/396; 285/402
[58] Field of Search .............................. 285/34, 35, 314, 285/316, 396, 401, 402

[56] References Cited

U.S. PATENT DOCUMENTS

| | | | |
|---|---|---|---|
| 7,318 | 4/1850 | Brown | 285/396 |
| 12,937 | 5/1855 | Hicks | 285/401 X |
| 437,915 | 10/1890 | Costigan | 385/401 |
| 727,858 | 5/1903 | Stier | 285/396 X |
| 1,968,075 | 7/1934 | Ewald | 285/401 |
| 2,099,048 | 11/1937 | Burns et al. | 285/402 X |
| 2,259,137 | 10/1941 | Iftiger | 285/35 |
| 2,918,259 | 12/1959 | Le Bus | 285/402 X |
| 3,761,117 | 9/1973 | Shendure | 285/316 X |
| 3,781,039 | 12/1973 | Locke et al. | 285/314 X |
| 4,198,080 | 4/1980 | Carpenter | 285/316 X |
| 4,412,694 | 11/1983 | Rosenberg | 285/314 X |
| 5,116,086 | 5/1992 | Psajd | 285/316 X |
| 5,593,239 | 1/1997 | Sallee | 285/316 X |

*Primary Examiner*—John A. Ricci
*Attorney, Agent, or Firm*—Arnold, White & Durkee

[57] ABSTRACT

A quick disconnect coupling utilizing a sleeve which is biased to secure the coupling members together. The sleeve has an internal cylindrical surface with a pair of protrusions which are machined or cast into the sleeve, dimensioned to slide within a longitudinal groove extending at least partially along the outer body of the female member of the coupling.

1 Claim, 2 Drawing Sheets

U.S. Patent Jul. 7, 1998 Sheet 1 of 2 5,775,744
FIG. 1
( PRIOR ART )
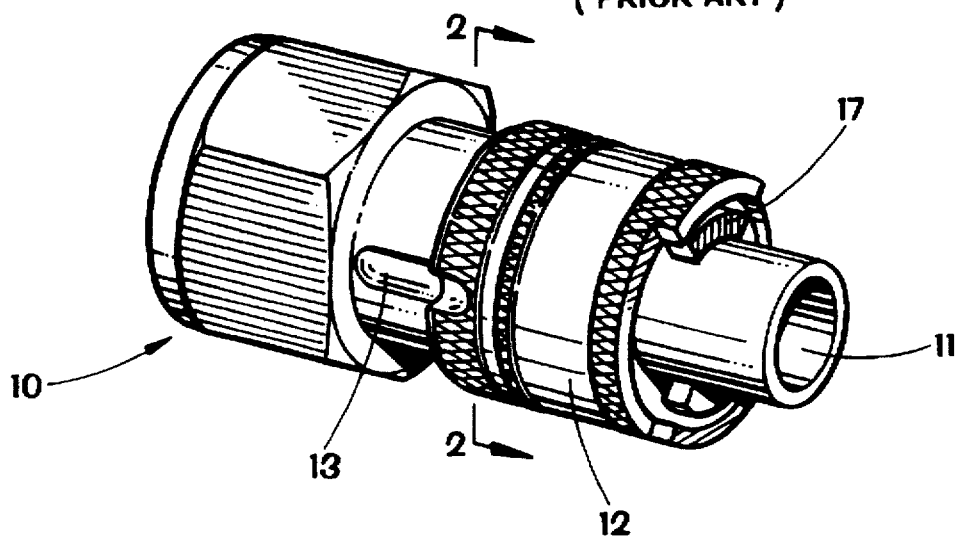
FIG. 2
( PRIOR ART )
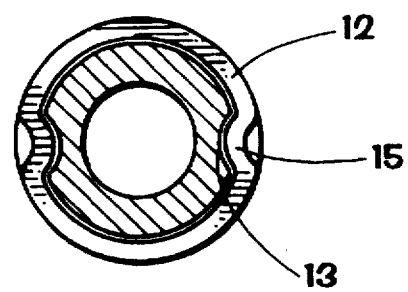
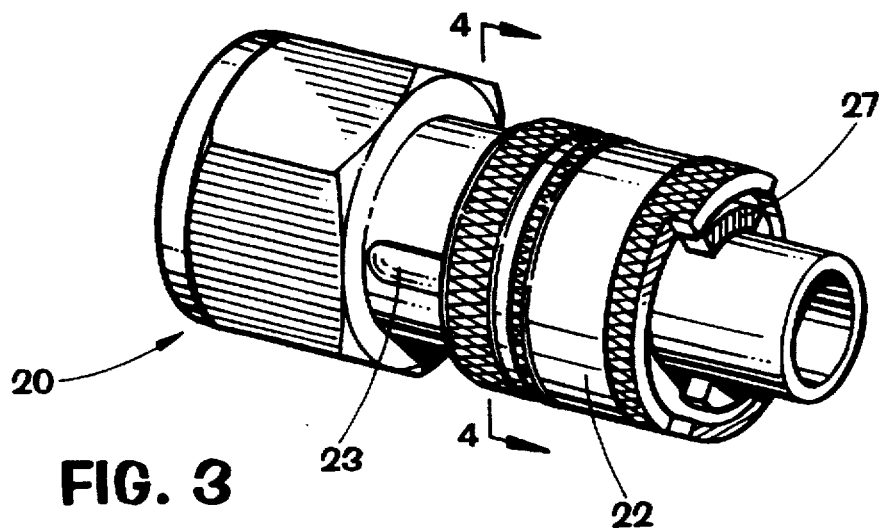
FIG. 3

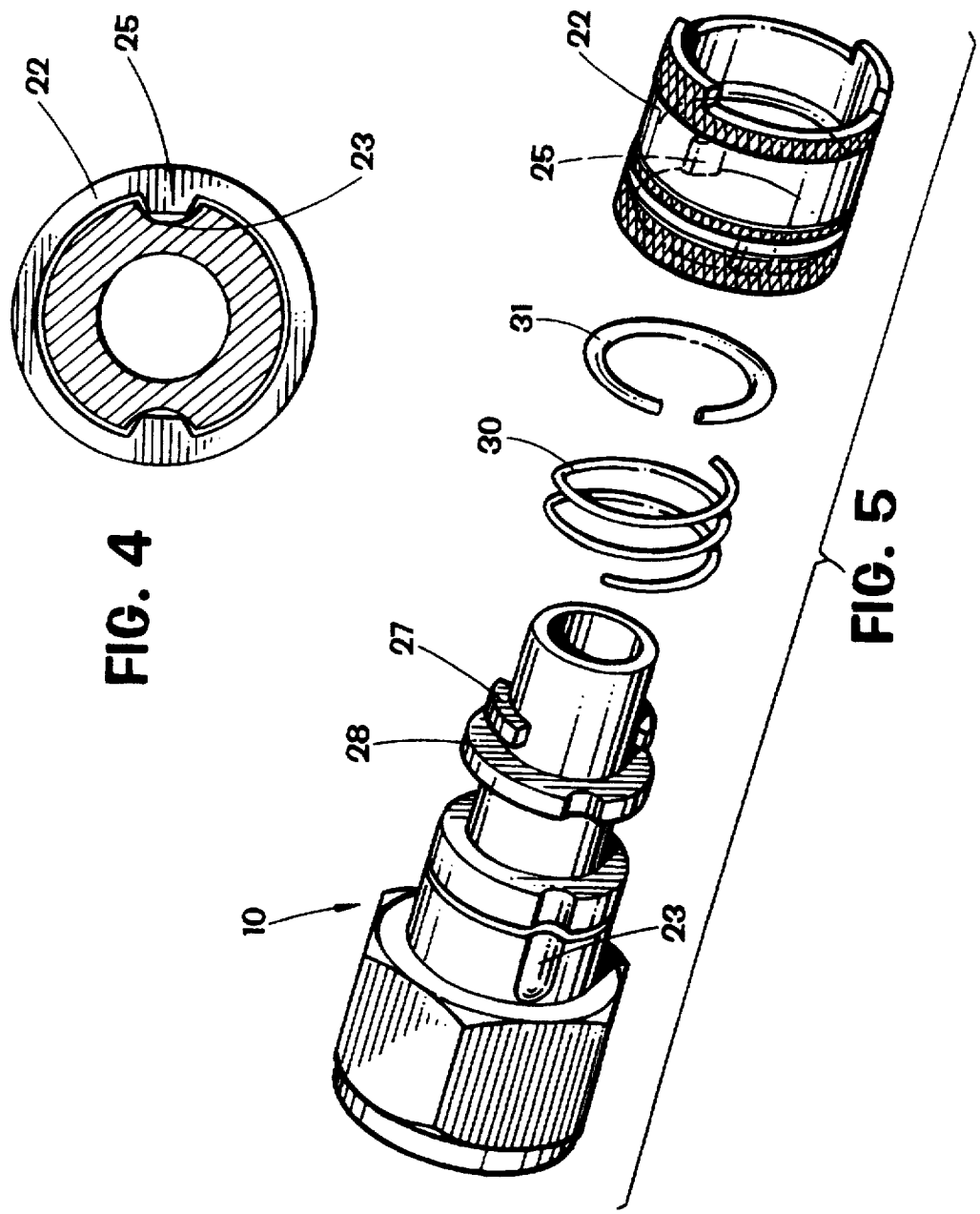

SLEEVE FOR QUICK DISCONNECT COUPLING

BACKGROUND OF THE INVENTION

1. Field of the Invention

This invention relates to couplings for interconnecting lines conveying fluid or gas. More particularly, the present invention relates to a sleeve for quick disconnect couplings which is slideable along the longitudinal axis of the coupling and is spring biased to help secure the coupling members together.

2. Description of Related Art

Couplings for lines conveying fluids or gases such as air often include a sleeve on one of the members. To connect the mating members, the sleeve may be manually pulled back longitudinally, then released to hold the opposing member against a shoulder or shoulder surfaces. In some instances, the opposing coupling member may be rotated about the longitudinal axis to engage or disengage the coupling members. For example, air couplings of the type sold by National Coupling Company, Inc. of Stafford, Tex., include a sleeve that is longitudinally moveable while it is guided by a pair of grooves in the coupling body. The inner cylindrical surface of the sleeve includes a pair of protrusions which, when the sleeve is properly aligned, mate with the pair of grooves in the coupling member body. In the past, protrusions in the sleeve have been formed by indenting the sleeve outer surface. However, the indentations are not uniform and detract from the integrity and appearance of the sleeve's outer surface. Accordingly, an improved sleeve for quick disconnect couplings is needed, which will not require indenting the outer surface of the sleeve member.

SUMMARY OF THE INVENTION

The sleeve of the present invention includes a pair of inwardly directed protrusions or shoulders machined or cast into the inner cylindrical surface of the sleeve. These protrusions or shoulders are formed without indenting the outer surface of the sleeve, and provide a more precise fit in the grooves in the coupling member body. Thus, one advantage of the present invention is an improved quick disconnect coupling wherein the sleeve is more precisely dimensioned to slide longitudinally when the coupling members are engaged or disengaged. Another advantage of the present invention is that it avoids forming any indentations in the outside surface the sleeve. Further advantages of the present invention will be apparent to those skilled in the art.

BRIEF DESCRIPTION OF THE DRAWINGS

FIG. 1 is a perspective view of a quick disconnect coupling member according to the prior art.

FIG. 2 is a cross-sectional view of the sleeve and grooves in the coupling member body, according to the prior art.

FIG. 3 Is a cross-sectional view of the coupling member according to a preferred embodiment of the present invention.

FIG. 4 is a cross-sectional view of the sleeve and coupling member body according to a preferred embodiment of the present invention.

FIG. 5 is an assembly view of the coupling member and sleeve according to a preferred embodiment of the present invention.

DETAILED DESCRIPTION OF A PREFERRED EMBODIMENT

First referring to FIG. 1 of the drawing, a quick disconnect coupling found in the prior art is shown. For example, couplings of this type have been produced by National Coupling Company, Inc. of Stafford, Tex. for use in air lines or similar applications. The coupling (10) has a longitudinal passageway (11) therethrough from a first end to a second end. A groove (13) extends longitudinally along the outer surface of at least a portion of the coupling member. The coupling member may also have one or more radial shoulder surfaces (17) which are used to help secure the opposing coupling member thereto. Sleeve (12) is slideable longitudinally along the coupling member (10) and, when released, will help secure the opposing coupling member against one or more of the shoulder surfaces.

Now referring to FIG. 2, a cross section view of the sleeve (12) and the longitudinal grooves (16) in the coupling member body are shown. Preferably, the grooves are spaced 180 degrees from each other. As shown in FIG. 2, protrusions (15) in the sleeve (12) are provided to align the sleeve and the coupling member. These protrusions are formed by punching or indenting the outer surface of the sleeve. However, as stated above, this method may result in non-uniform indentations or protrusions, as well as damage to the outer surface of the sleeve.

Now referring to FIG. 3, a coupling member (20) according to a preferred embodiment of the present invention is shown. The coupling member includes a longitudinal groove (23) along at least a portion of its outer longitudinal surface. The coupling member also includes at least one shoulder surface (27), as discussed above, that helps lock the opposing coupling member thereto. The sleeve (22) of the present invention performs the same function as that of the prior art, but, instead of protrusions formed by indentations in the outer surface of the sleeve, a pair of protrusions or shoulders (25) are machined or cast into the inner cylindrical surface of sleeve (22) as shown in FIG. 4. These protrusions or shoulder surfaces (25) are dimensioned to slide within the grooves (26) in the coupling member body. While the protrusions are aligned with these grooves, the radial movement of the sleeve with respect to the coupling member is prevented. "The first end of the sleeve has a stepped surface (29) for engagement with the opposing coupling member. The sleeve may be retracted to compress spring (30) and expose shoulder surface (27). During retraction of the sleeve, the pair of protrusions slide in longitudinal grooves in the body. The opposing coupling member may be rotated with respect to outer shoulder surface (27) until a portion of the opposing coupling member is positioned behind the outer shoulder surface. When the sleeve is released, the spring urges the stepped surface (29) axially against the opposing coupling member and locks the opposing coupling member behind shoulder surface (27)."

FIG. 5 provides an assembly view of the coupling member (20) and sleeve (22) according to a preferred embodiment. The coupling member (20) includes a groove (23) along at least a portion of its outer longitudinal surface, and shoulder surfaces (27) and (28) which together with sleeve (22), help secure the mating coupling members. Spring (30) and clip (31) help urge the sleeve longitudinally to secure the coupling members together. To disengage the coupling members, the sleeve may be manually pushed back to compress the spring and the opposing coupling member rotatedatially.

Although variations in the embodiment of the present invention may not each realize all of the advantages of the invention, certain features may become more important than others in various applications of the device. The invention, accordingly, should be understood to be limited only by the scope of the appended claims.

What is claimed is:

1. A coupling member for engagement with an opposing coupling member comprising:

(a) a body having a cylindrical passageway therethrough, at least one outer shoulder surface, and a pair of longitudinal grooves extending at least partially along the body;

(b) a sleeve dimensioned to slide over the body, the sleeve having a first end and a second end, an internal cylindrical surface and a pair of protrusions extending inwardly therefrom, the protrusions machined into the internal cylindrical surface of the sleeve, the first end having a stepped surface for engagement with the opposing coupling member; and (c) a spring between the body and the sleeve, the sleeve retractable longitudinally to compress the spring and expose the outer shoulder surface of the body the pair of protrusions sliding in the pair of longitudinal grooves when the sleeve is retracted.

* * * * *